United States Patent
Ahrens et al.

(10) Patent No.: US 7,424,574 B1
(45) Date of Patent: Sep. 9, 2008

(54) METHOD AND APPARATUS FOR DYNAMIC STRIPING

(75) Inventors: Matthew A. Ahrens, San Francisco, CA (US); Jeffrey S. Bonwick, Los Altos, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 223 days.

(21) Appl. No.: 10/828,677

(22) Filed: Apr. 21, 2004

(51) Int. Cl.
G06F 12/00 (2006.01)
G06F 9/34 (2006.01)
G06F 21/00 (2006.01)

(52) U.S. Cl. .............. 711/114; 711/6; 711/154; 711/170; 711/202; 711/203

(58) Field of Classification Search .......... 711/6, 711/114, 170, 202–203, 154; 707/10, 205
See application file for complete search history.

(56) References Cited

U.S. PATENT DOCUMENTS

| | | | |
|---|---|---|---|
| 4,144,522 A | 3/1979 | Kageyama et al. | |
| 5,129,085 A | 7/1992 | Yamasaki et al. | |
| 5,155,847 A | 10/1992 | Kirouac et al. | |
| 5,371,885 A | 12/1994 | Letwin | |
| 5,403,639 A | 4/1995 | Belsan et al. | |
| 5,410,667 A | 4/1995 | Belsan et al. | |
| 5,675,802 A | 10/1997 | Allen et al. | |
| 5,819,292 A | 10/1998 | Hitz et al. | |
| 6,209,111 B1 | 3/2001 | Kadyk et al. | |
| 6,341,341 B1 | 1/2002 | Grummon et al. | |
| 6,745,284 B1* | 6/2004 | Lee et al. ................. | 711/114 |
| 6,745,305 B2 | 6/2004 | McDowell | |
| 6,795,966 B1 | 9/2004 | Lim et al. | |
| 6,857,001 B2 | 2/2005 | Hitz et al. | |
| 6,892,211 B2 | 5/2005 | Hitz et al. | |
| 7,007,196 B2 | 2/2006 | Lee et al. | |
| 7,032,154 B2 | 4/2006 | Kidorf et al. | |
| 7,043,677 B1 | 5/2006 | Li | |
| 7,133,964 B2 | 11/2006 | Rodrigues et al. | |
| 7,162,486 B2 | 1/2007 | Patel et al. | |
| 7,174,352 B2 | 2/2007 | Kleiman et al. | |
| 7,200,715 B2 | 4/2007 | Kleiman et al. | |
| 2002/0004883 A1* | 1/2002 | Nguyen et al. ............. | 711/111 |
| 2002/0055942 A1 | 5/2002 | Reynolds | |
| 2002/0087788 A1 | 7/2002 | Morris | |

(Continued)

OTHER PUBLICATIONS

Austin, B.; "*A Dynamic Disc Allocation Algorithm Designed to Reduce Fragmentation During File Reloading*"; Information Sciences Laboratory, Corporate Research and Development Center, General Electric Company, 1970: pp. 378-381 (4 pages).

(Continued)

*Primary Examiner*—Sanjiv Shah
*Assistant Examiner*—Yaima Campos
(74) *Attorney, Agent, or Firm*—Osha Liang LLP (57) ABSTRACT

A method for dynamic striping, involving receiving a request to write a data block into a storage pool, determining a physical disk location in the storage pool to store the data block using a dynamic striping policy, storing the data block at the physical disk location, and storing a first indirect block in the storage pool, wherein the first indirect block comprises the data block location and the data block checksum.

20 Claims, 6 Drawing Sheets

U.S. PATENT DOCUMENTS

| | | | |
|---|---|---|---|
| 2002/0161972 A1* | 10/2002 | Talagala et al. | 711/114 |
| 2003/0033477 A1* | 2/2003 | Johnson et al. | 711/114 |
| 2003/0126107 A1 | 7/2003 | Yamagami | |
| 2003/0145167 A1* | 7/2003 | Tomita | 711/114 |
| 2004/0024963 A1* | 2/2004 | Talagala et al. | 711/114 |
| 2004/0098720 A1 | 5/2004 | Hooper | |
| 2004/0107314 A1* | 6/2004 | Kim et al. | 711/114 |
| 2004/0123063 A1* | 6/2004 | Dalal et al. | 711/170 |
| 2004/0225834 A1* | 11/2004 | Lu et al. | 711/114 |
| 2004/0234000 A1 | 11/2004 | Page | |
| 2005/0010620 A1 | 1/2005 | Silvers et al. | |
| 2005/0097270 A1* | 5/2005 | Kleiman et al. | 711/114 |
| 2005/0235154 A1 | 10/2005 | Serret-Avila | |
| 2006/0168409 A1 | 7/2006 | Kahn et al. | |
| 2006/0218644 A1 | 9/2006 | Niles et al. | |
| 2006/0256965 A1 | 11/2006 | Rowe | |

OTHER PUBLICATIONS

Goodheart, B. et al.; "*The Magic Garden Explained*"; Prentice Hall, 1994; pp. 24-25, 29-30, 390-391 (8 pages).

Stallings, W.; "*Computer Organization and Architecture: Designing for Performance*"; Prentice Hall, Fifth Edition; 2000; pp. 377-378 (4 pages).

Sandberg, R. et al., "Design and Implementation of the Sun Network Filesystem"; Sun Microsystems, Inc., 1985 USENIX Conference (12 pages).

McKusick, M. K. et al.; "A Fast File System for UNIX"; ACM Transaction on Computer Systems, vol. 2, No. 3, Aug. 1984, pp. 181-197 (17 pages).

Astrahan, M.M. et al.; "System R: Relational Approach to Database Management"; ACM Transactions on Database Systems, vol. 1, No. 2, Jun. 1976, pp. 97-137 (41 pages).

"VERITAS File System 3.4 Administrator's Guide" VERITAS Software Corporation, Nov. 2000, http://www.veritas.com; pp. 1-227 (227 pages).

Czezatke C. et al.; "Linlogfs: A Log-Structured Filesystem for Linux"; The Usenix Association, Proceedings of FREENIX Track: 2000 USENIX Annual Technical Conference, San Diego, California, Jun. 18-23, 2000 (13 pages).

Osorio, N. et al.; "Guidelines for Using Snapshot Storage Systems for Oracle Databases"; Oracle Corporation, Oct. 2001 (13 pages).

Quinlan, S.; "A Cached Worm File System"; AT&T Bell Laboratories, Murry Hill, New Jersey: Software-Practice and Experience, vol. 21(12), pp. 1289-1299, Dec. 1991 (11 pages).

Sun StorEdge Instant Image 2.0 System Administrator's Guide; Sun Microsystems, Inc., Feb. 2000, Revision A (106 pages).

Ylonen, T.; "Concurrent Shadow Paging: A New Direction for Database Research"; Laboratory of Information Processing Science, Helsinki University of Technology, SF-02150, Espoo, Finland, 1992 (8 pages).

Popek, G. et al.; "The LOCUS Distributed System Architecture"; The MIT Press, Cambridge, Massachusetts, 1985 The Massachusetts Institute of Technology (8 pages).

Gray, J. et al.; "The Recovery Manager of the System R Database Manager"; Computing Surveys, vol. 13, No. 2, Jun. 1981 (20 pages).

Schilling, J.; "Enrwurf und Implementierung eines schnellen Filesystems fur Unix unter besonderer Berucksichtigung der technischen Parameter optischer Speichermedien und multimedialer Anwendungen"; Diplomarbeir Jorg Schilling, eingereicht am 23.05, 1991 an der TU Berlin, and English Translation (245 pages).

Ylonen, T.; "Concurrent Shadow Paging: Snapshots, Read-Only Transactions, and On-The-Fly Multi-Level Incremental Dumping"; Laboratory of Information Processing Science, Helsinki University of Technology, FIN-02150, Espp, Finland, 1993 (22 pages).

"The Enterprise Challenge Served by Snapshot"; Whitepaper, 2001 LSI logic Corporation (8 pages).

Agrawal, R. et al.; "Integrated Concurrency Control and Recovery Mechanisms: Design and Performance Evaluation"; ACM Transactions on Database Systems, vol. 10, No. 4, Dec. 1985, pp. 529-564 (36 pages).

Suresh, Babu S.; "Persistent Snapshots"; Department of Computer Science and Automation, Indian Institute of Science, Bangalore - 560 012, Jan. 2000 (38 pages).

"Proceedings of the 5th Annual Linux Showcase & Conference" USENIX Association, Oakland, California, Nov. 5-10, 2001 (11 pages).

Borg, A. et al.; "Fault Tolerance Under UNIX"; ACM Transactions on Computer Systems, vol. 7, No. 1, Feb. 1989, pp. 1-24 (24 pages).

Rosenblum, M. et al.; "The Design and Implementation of a Log-Structured File System"; Electrical Engineering and Computer Sciences, Computer Science Division, University of California, 1991 (15 pages).

Hecht, M. S. et al.; "Shadowed Management of Free Disk Pages with a Linked List"; ACM Transactions on Database Systems, vol. 8, No. 4, Dec. 1983, pp. 503-514 (12 pages).

Rosenblum, M. et al.; "The LFS Storage Manager" Computer Science Division, Electrical Engineering and Computer Sciences, University of California; presented at the Summer '90 USENIX Technical Conference, Anaheim, California, Jun. 1990 (16 pages).

Lorie, R. A.; "Physical Intergrity in a Large Segmented Database"; ACM Transactions on Database Systems, vol. 2, No. 1, Mar. 1977, pp. 91-104 (14 pages).

* cited by examiner

METHOD AND APPARATUS FOR DYNAMIC STRIPING

BACKGROUND

A typical operating system includes a file system. The file system provides a mechanism for the storage and retrieval of files and a hierarchical directory structure for the naming of multiple files. More specifically, the file system stores information provided by the user (i.e., data) and information describing the characteristics of the data (i.e., metadata). The file system also provides extensive programming interfaces to enable the creation and deletion of files, reading, and writing of files, performing seeks within a file, creating and deleting directories, managing directory contents, etc. In addition, the file system also provides management interfaces to create and delete file systems. File systems are typically controlled and restricted by operating system parameters. For example, most operating systems limit the maximum number of file names that can be handled within their file system. Some operating systems also limit the size of files that can be managed under a file system.

To access a file, the operating system (via the file system) typically provides file manipulation interfaces to open, close, read, and write the data within each file. An application, which may reside on the local system (i.e., computer) or may be located on a remote system, uses files as an abstraction to address data. Conventionally, this data is stored on a storage device, such as a disk. The file system stores data on the storage device by managing the allocation of space within the storage device.

Typically, the volume manager provides space which is managed by the file system. Two common types of file system space allocation strategies are known as block-based allocation and extent-based allocation. Block-based allocation creates incremental disk space for each file each time the file is extended (i.e., modified via a write request to add information), whereas extent-based allocation creates a large series of contiguous blocks (i.e., extents) each time the file exhausts the space available in the file's last extent.

When allocating space, both block-based and extent-based allocation use space provided by the volume manager. The volume manager allows multiple physical disks to be used as a single volume (i.e., a virtual disk) to provide larger consolidated storage sizes and simpler management. The volume manager allows users to organize data along volume boundaries (i.e., each volume has physical disk space allocated to the volume such that the volume is tied only to that dedicated physical disk). The volume manager is typically implemented as a separate layer between the physical disks and the file system, and is presented to the user as a virtual disk device. In other words, volume managers organize the collections of physical devices (e.g., disks) into virtual devices. Additionally, the space allocated within the volume manager is handled by the file system. Consequently, the volume manager is not aware of which blocks within the available storage space are in use and which blocks are free for data to be stored.

Further, file systems may be mounted on the virtual disk devices. Thus, physical disks are partitioned and allocated to multiple virtual disk devices, and each virtual disk device is capable of having a file system that exclusively uses that particular virtual disk device. A request to access a file is typically performed by an application, via the file system, using a file name and logical offset. This file name and logical offset (i.e., the manner in which applications express file operation requests) corresponds to a location within the virtual disk device. Subsequently, the request is translated to physical disk space on the storage device by the volume manager, allowing the user of the application to access the data within a particular file.

The speed of the processor associated with a particular file system is typically orders of magnitude faster than accessing physical disk space. A common method of reducing the bottleneck resulting from disparity in execution time is to use processor speed to optimize physical disk access.

An array of independent disks (e.g., Redundant Array of Independent Disks (RAID)) is a common data storage system utilized to improve system performance. With multiple physical disks organized in an array, separate input/output (I/O) requests can be handled in parallel, provided that the data for each request resides on a separate disk. The physical disks in the data storage system are typically segmented into blocks of data space. A block may include any appropriate number of bytes of data (e.g., 512 bytes, 1024 bytes, etc.).

The concept of data striping is fundamental to improving performance of physical disk access when using an array of physical disks. Data striping involves spreading blocks across multiple physical disks. The blocks may be interleaved in a round-robin fashion, so that the combined space is composed alternately of blocks from each disk. The stripe unit (i.e., the number of blocks stored in an I/O request) may be as small as one sector (i.e., 512 bytes) or as large as several megabytes. The stripe width corresponding to the number of physical disks on which blocks are stored. For example, in a five disk array, the first five logical blocks are stored as the first physical blocks on each of the five disks (e.g., at offset zero in each of the five physical disks), forming a stripe across all the physical disks. Similarly, the next five logical blocks may be stored at offset one of each of the five physical disks, etc. In this example, the stripe width of each data stripe is a fixed stripe width of five data blocks, and the stripe unit is one block.

Using the aforementioned method, striping data across multiple physical disks results in the physical location of data being a function of the number of physical disks (i.e., the stripe width of each stripe of data is dependent on the number of disks). Therefore, in general, to retrieve data stored using data striping, the $n^{th}$ data block maps to disk n mod d (i.e., n % d), where d is the number of physical disks in the volume. The result of the calculation n divided by d (i.e., n/d) points to the correct offset within the disk where the data of block n is located. Because of the aforementioned mathematical relationships, adding or deleting physical disks causes the location of blocks to become invalid.

SUMMARY

In general, in one aspect, the invention relates to a method for dynamic striping, comprising receiving a request to write a data block into a storage pool, determining a physical disk location in the storage pool to store the data block using a dynamic striping policy, storing the data block at the physical disk location, and storing a first indirect block in the storage pool, wherein the first indirect block comprises the data block location and the data block checksum.

In general, in one aspect, the invention relates to a system for storing a data block, comprising a storage pool comprising the data block and a first indirect block, wherein the first indirect block comprises a data block checksum and a data block location, and a storage pool allocator configured to store the data block and the first indirect block in the storage pool using a dynamic striping policy.

In general, in one aspect, the invention relates to a computer system for dynamic striping, comprising a processor, a memory, a storage device, and software instructions stored in the memory for enabling the computer system under control of the processor, to receive a request to write a data block into a storage pool, determine a physical disk location in the storage pool to store the data block using a dynamic striping policy, store the data block at the physical disk location, and store a first indirect block in the storage pool, wherein the first indirect block comprises the data block location and the data block checksum.

In general, in one aspect, the invention relates to a network system having a plurality of nodes, comprising a storage pool comprising the data block and a first indirect block, wherein the first indirect block comprises a data block checksum and a data block location, and a storage pool allocator configured to store the data block and the first indirect block in the storage pool using a dynamic striping policy, wherein the storage pool is located on any one of the plurality of nodes, and wherein the storage pool allocator is located on any one of the plurality of nodes.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

In general, embodiments of the invention relate to providing a method and apparatus for data striping. More specifically, embodiments of the invention relate to a file system that includes using data blocks and indirect blocks to store files within the file system to allow dynamic changes within the data storage system. Further, embodiments of the invention provide a method and apparatus to allocate data blocks using a dynamic striping policy such that striped data may be retrieved from the file system in a manner that is independent of the number physical disks within the data storage system.

Figure 1:
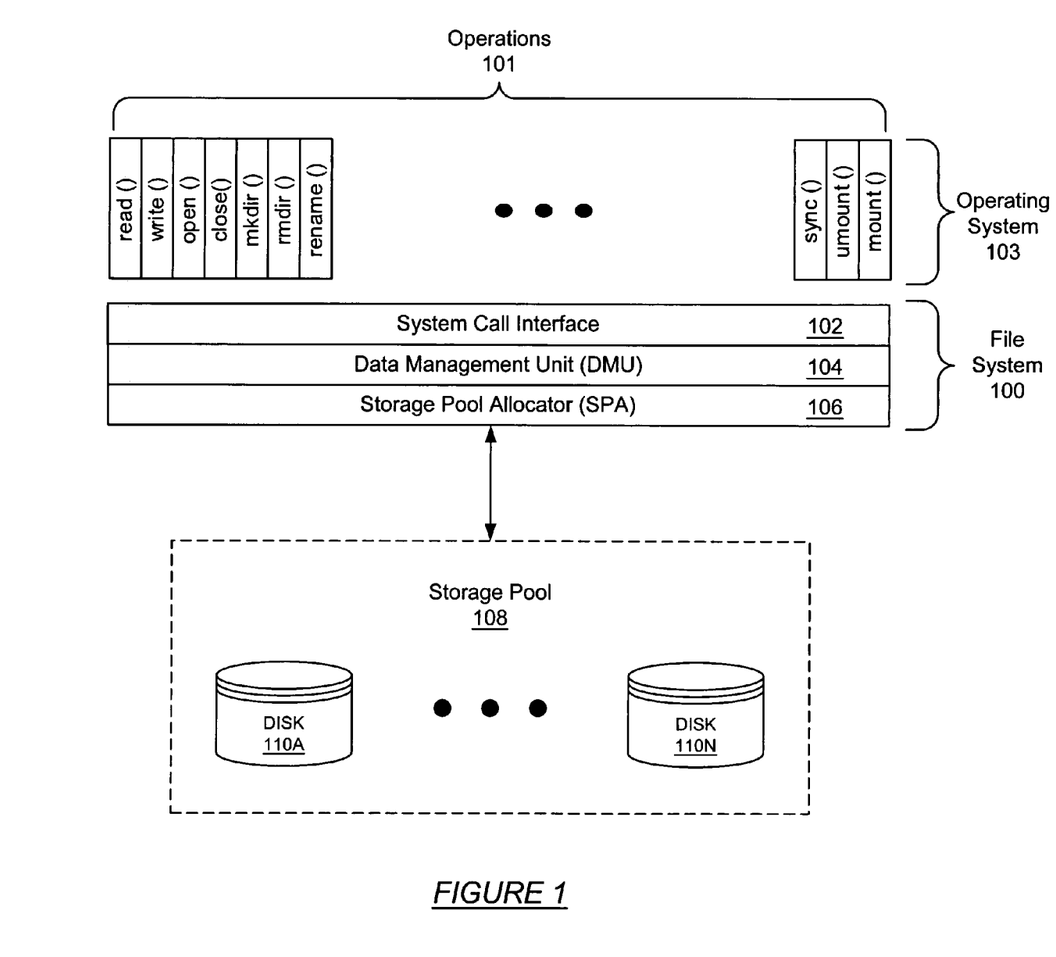
FIG. 1 shows a system architecture in accordance with an embodiment of the invention.

FIG. 1 shows a system architecture in accordance with one embodiment of the invention. The system architecture includes an operating system (103) interacting with a file system (100), which in turn interfaces with a storage pool (108). In one embodiment of the invention, the file system (100) includes a system call interface (102), a data management unit (DMU) (104), and a storage pool allocator (SPA) (106).

The operating system (103) typically interfaces with the file system (100) via a system call interface (102). The operating system (103) provides operations (101) for users to access files within the file system (100). These operations (101) may include read, write, open, close, etc. In one embodiment of the invention, the file system (100) is an object-based file system (i.e., both data and metadata are stored as objects). More specifically, the file system (100) includes functionality to store both data and corresponding metadata in the storage pool (108). Thus, the aforementioned operations (101) provided by the operating system (103) correspond to operations on objects.

In one embodiment of the invention, a request to perform a particular operation (101) (i.e., a transaction) is forwarded from the operating system (103), via the system call interface (102), to the DMU (104). In one embodiment of the invention, the DMU (104) translates the request to perform an operation on an object directly to a request to perform a read or write operation at a physical location within the storage pool (108). The DMU (104) represents the objects as data blocks and indirect blocks as described in FIG. 3 below. Additionally, in one embodiment of the invention, the DMU (104) includes functionality to group related work (i.e., modifications to data blocks and indirect blocks) into I/O requests allowing related blocks to be forwarded to the SPA (106) together. The SPA (106) receives transactions from the DMU (106) and subsequently writes the blocks into the storage pool (108). The operation of the SPA (106) is described in FIG. 2 below.

In one embodiment of the invention, the storage pool (108) includes one or more physical disks (disks (110A-110N)). Further, in one embodiment of the invention, the storage capacity of the storage pool (108) may increase and decrease dynamically as physical disks are added and removed from the storage pool. In one embodiment of the invention, the storage space available in the storage pool (108) is managed by the SPA (106).

Figure 2:
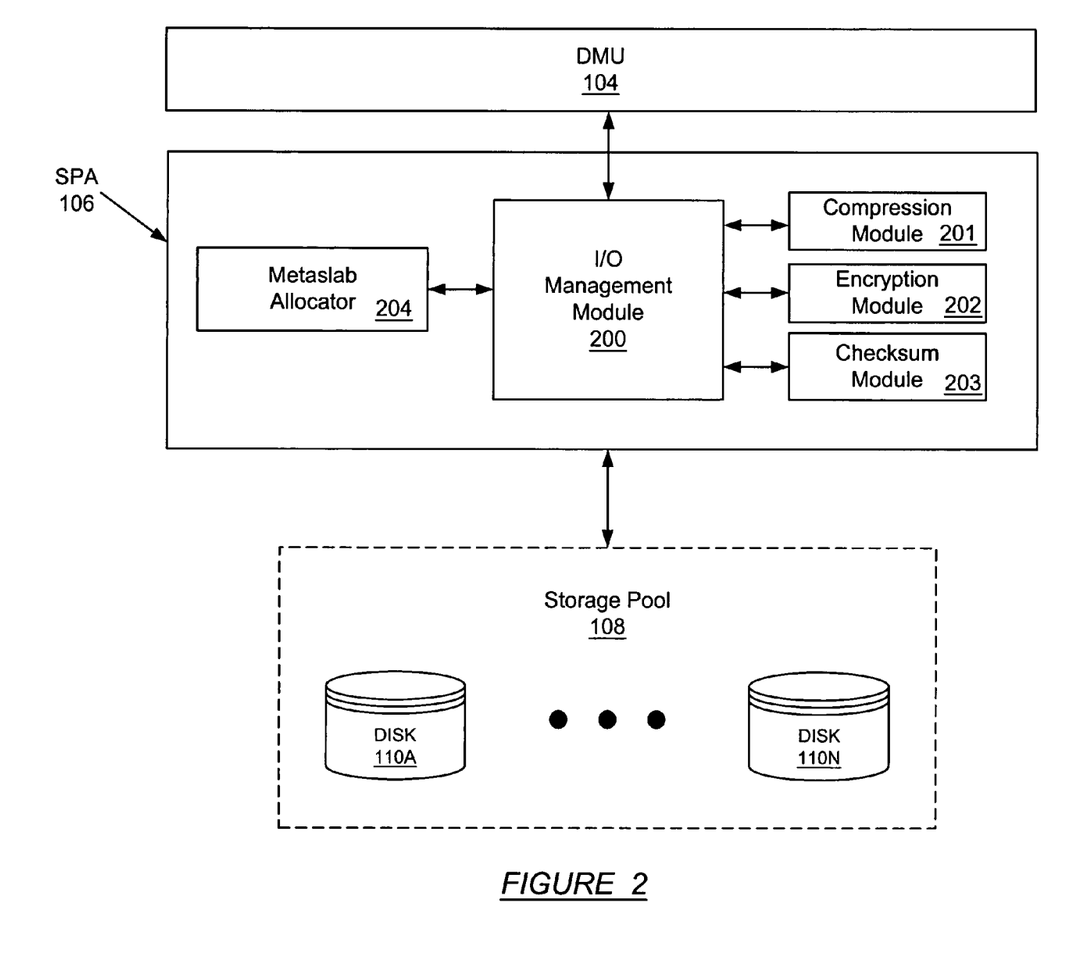
FIG. 2 shows a storage pool allocator in accordance with an embodiment of the invention.

FIG. 2 shows the SPA (106) in accordance with one embodiment of the invention. The SPA (106) may include an I/O management module (200), a compression module (201), an encryption module (202), a checksum module (203), and a metaslab allocator (204). Each of these modules is described in detail below.

As noted above, the SPA (106) receives transactions from the DMU (104). More specifically, the I/O management module (300), within the SPA (106) receives transactions from the DMU (104) and groups the transactions into transaction groups in accordance with one embodiment of the invention. The compression module (201) provides functionality to compress larger logical blocks (i.e., data blocks and indirect blocks) into smaller segments, where a segment is a region of physical disk space. For example, a logical block size of 8K bytes may be compressed to a size of 2K bytes for efficient storage. Further, in one embodiment of the invention, the encryption module (202) provides various data encryption algorithms. The data encryption algorithms may be used, for example, to prevent unauthorized access. In one embodiment of the invention, the checksum module (203) includes functionality to calculate a checksum for data (i.e., data stored in a data block) and metadata (i.e., data stored in an indirect block) within the storage pool. The checksum may be used, for example, to ensure data has not been corrupted.

As discussed above, the SPA (106) provides an interface to the storage pool and manages allocation of storage space within the storage pool (108). In one embodiment of the invention, the SPA (106) uses the metaslab allocator (204) to manage the allocation of storage space in the storage pool (108).

In one embodiment of the invention, the storage space in the storage pool is divided into contiguous regions of data, i.e., metaslabs. The metaslabs may in turn be divided into segments (i.e., portions of the metaslab). The segments may all be the same size, or alternatively, may be a range of sizes. The metaslab allocator (204) includes functionality to allocate large or small segments to store data blocks and indirect blocks. In one embodiment of the invention, allocation of the segments within the metaslabs is based on the size of the blocks within the I/O requests. That is, small segments are allocated for small blocks, while large segments are allocated for large blocks. The allocation of segments based on the size of the blocks may allow for more efficient storage of data and metadata in the storage pool by reducing the amount of unused space within a given metaslab. Further, using large segments for large blocks may allow for more efficient access to data (and metadata) by reducing the number of DMU (104) translations and/or reducing the number of I/O operations. In one embodiment of the invention, the metaslab allocator may include a policy that specifies a method to allocate segments.

In one embodiment of the invention, the metaslab allocator (204) includes a dynamic striping policy to determine how to dynamically stripe data. As noted above, striping data involves writing data to multiple disks that are organized in an array. In one embodiment of the invention, the dynamic striping policy allows the metaslab allocator (204) to allocate space to write data in an organized manner, rather than randomly allocate data blocks from anywhere within the storage pool (108). For example, a dynamic striping policy may be a round robin policy, which specifies that data is evenly striped across all the available disks in the storage pool. One skilled in the art will appreciate that several other policies may be used to dynamically stripe data (e.g., data striped based on physical disk speed, data striped based on free space available on physical disks, data striped based on load on the physical disks, etc.).

Figure 3:
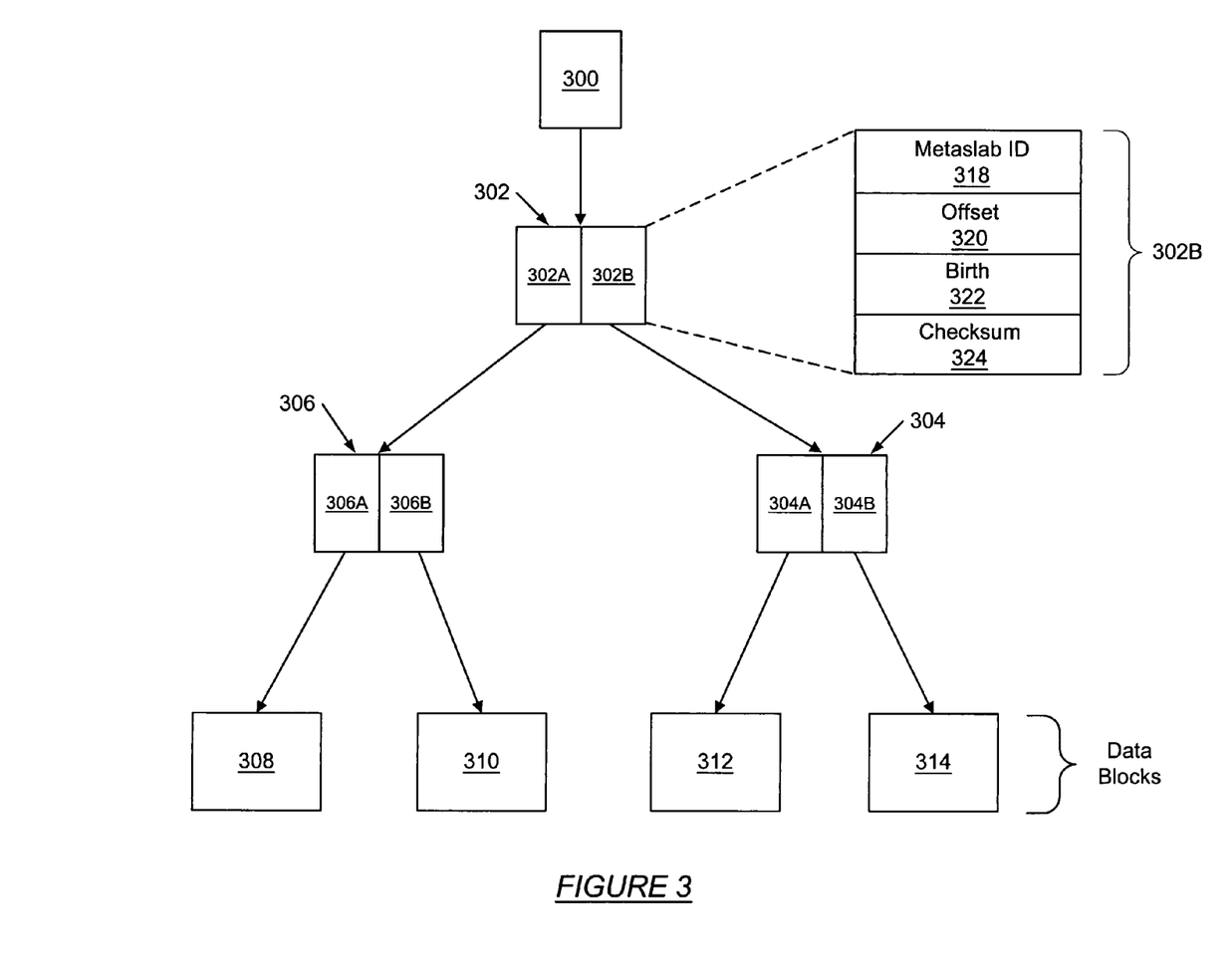
FIG. 3 shows a hierarchical data configuration in accordance with an embodiment of the invention.

As noted above, the storage pool (108) is divided into metaslabs, which are further divided into segments. Each of the segments within the metaslab may then be used to store a data block (i.e., data) or an indirect block (i.e., metadata). FIG. 3 shows the hierarchical data configuration (hereinafter referred to as a "tree") for storing data blocks and indirect blocks within the storage pool in accordance with one embodiment of the invention. In one embodiment of the invention, the tree includes a root block (300), one or more levels of indirect blocks (302, 304, 306), and one or more data blocks (308, 310, 312, 314). In one embodiment of the invention, the location of the root block (300) is in a particular location within the storage pool. The root block (300) typically points to subsequent indirect blocks (302, 304, and 306). In one embodiment of the invention, indirect blocks (302, 304, and 306) may be arrays of block pointers (e.g., 302A, 302B, etc.) that, directly or indirectly, reference to data blocks (308, 310, 312, and 314). The data blocks (308, 310, 312, and 314) contain actual data of files stored in the storage pool. One skilled in the art will appreciate that several layers of indirect blocks may exist between the root block (300) and the data blocks (308, 310, 312, 314).

In contrast to the root block (300), indirect blocks and data blocks may be located anywhere in the storage pool (108 in FIG. 1). In one embodiment of the invention, the root block (300) and each block pointer (e.g., 302A, 302B, etc.) includes data as shown in the expanded block pointer (302B). One skilled in the art will appreciate that data blocks do not include this information; rather data blocks contain actual data of files within the file system.

In one embodiment of the invention, each block pointer includes a metaslab ID (318), an offset (320) within the metaslab, a birth value (322) of the block referenced by the block pointer, and a checksum (324) of the data stored in the block (data block or indirect block) referenced by the block pointer. In one embodiment of the invention, the metaslab ID (318) and offset (320) are used to determine the location of the block (data block or indirect block) in the storage pool. The metaslab ID (318) identifies a particular metaslab. More specifically, the metaslab ID (318) may identify the particular disk (within the storage pool) upon which the metaslab resides and where in the disk the metaslab begins. The offset (320) may then be used to reference a particular segment in the metaslab. In one embodiment of the invention, the data within the segment referenced by the particular metaslab ID (318) and offset (320) may correspond to either a data block or an indirect block. If the data corresponds to an indirect block, then the metaslab ID and offset within a block pointer in the indirect block are extracted and used to locate a subsequent data block or indirect block. The tree may be traversed in this manner to eventually retrieve a requested data block.

In one embodiment of the invention, copy-on-write transactions are performed for every data write request to a file. Specifically, all write requests cause new segments to be allocated for the modified data. Therefore, the retrieved data blocks and indirect blocks are never overwritten (until a modified version of the data blocks and indirect blocks is committed). More specifically, the DMU writes out all the modified data blocks in the tree to unused segments within the storage pool. Subsequently, the DMU writes out the corresponding block pointers (within indirect blocks) to unused segments in the storage pool. In one embodiment of the invention, fields (i.e., metaslab ID, offset, birth, checksum) for the corresponding block pointers are populated by the DMU prior to sending the I/O request to the SPA. The indirect blocks containing the block pointers are typically written one level at a time. To complete the copy-on-write transaction, the SPA issues a single write that atomically changes the root block to reference the indirect blocks referencing the modified data block.

In one embodiment of the invention, dynamic data striping uses the infrastructure shown in FIGS. 1-3 and copy-on-write transactions to allow the retrieval of striped data independently of the number of physical disks in the storage pool in which the data is stored. For example, in one embodiment of the invention, when data is striped, each write request causes a data block to be assembled by the DMU, allocated by the metaslab allocator, and stored by the SPA in order to facilitate copy-on-write transactions.

Figure 4:
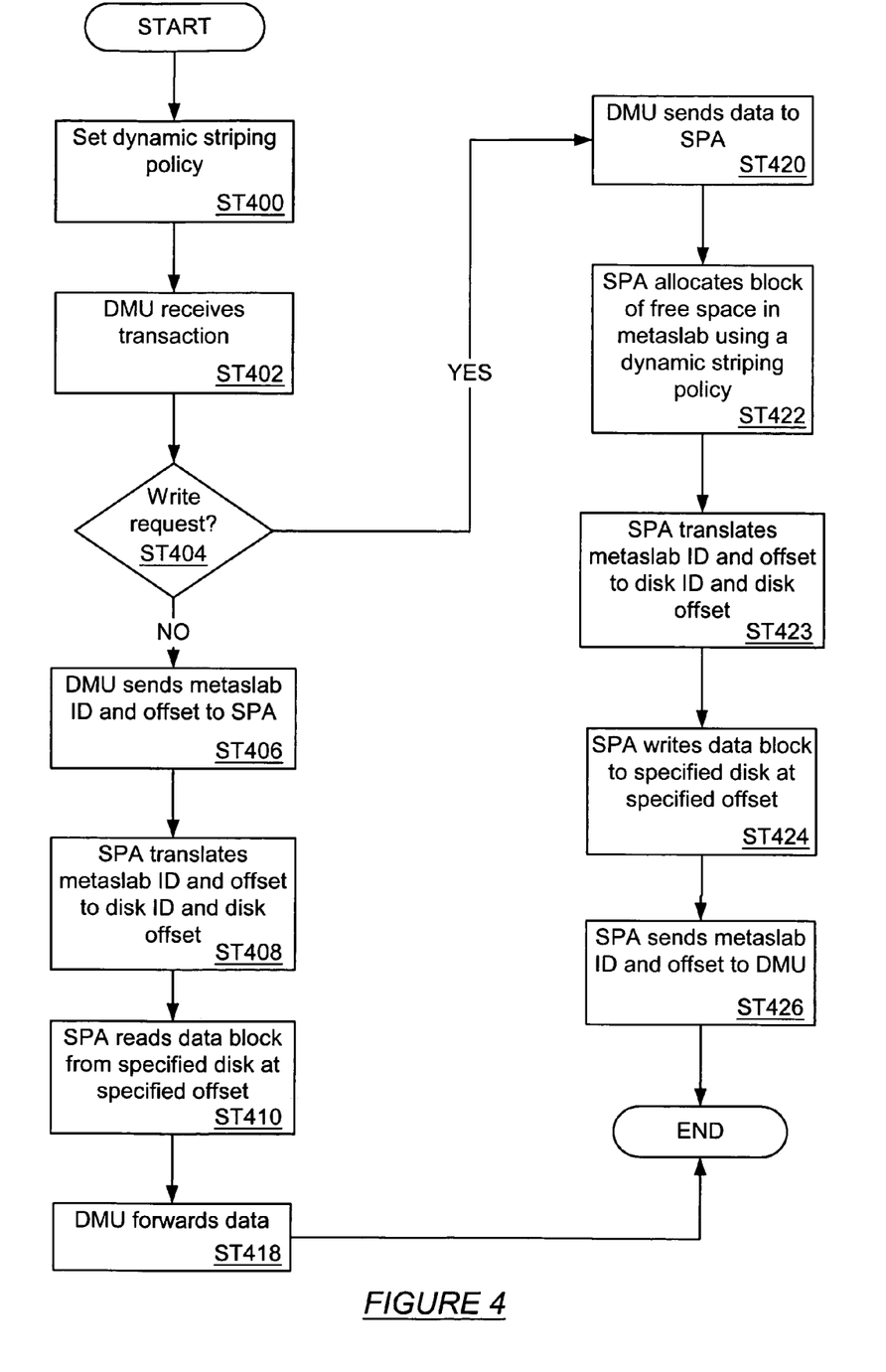
FIG. 4 shows a chart for a process for dynamic striping in accordance with an embodiment of the invention.

FIG. 4 shows a flow chart for dynamic data striping in accordance with one embodiment of the invention. Initially, a dynamic striping policy is set within the metaslab allocator (Step 400). This may be done anytime before data is written to data blocks within the storage system. Moreover, the policy may be changed at any time without affecting the retrieval of previously stored data. This is possible because of the tree structure used to store data blocks and indirect blocks in physical disks (described further in FIG. 5). A transaction is subsequently received by the DMU (Step 402). The DMU then determines whether the transaction is a write request (Step 404). If the transaction is not a write request, i.e., the operation is a read request, then the DMU sends a metaslab ID and offset of a block pointer to the SPA (Step 406).

The SPA subsequently translates the metaslab ID and offset of the block pointer to a corresponding physical disk ID and disk offset (i.e., a physical location) (Step 408). The SPA then reads the block (i.e., data block or indirect block) at the specified disk ID and disk offset (Step 410). If the block retrieved by the SPA is a data block, the DMU forwards the contents of the data block to the requesting application (or process) (Step 418) and the process ends. In contrast, if the block retrieved by the SPA is not a data block, the metaslab ID and offset of the indirect block is sent to the SPA. This process continues until the last level of the tree is reached and the data from the data block is read. In one embodiment of the invention, the data read request may be a request to read dynamically striped data (described below in FIG. 5).

If the transaction received by the DMU is a write request, then the DMU sends the data block and to the SPA (Step 420). The SPA (specifically the metaslab allocator) allocates a segment of free space in a particular metaslab using the aforementioned dynamic striping policy (Step 422). As noted above, the segment allocated by the metaslab allocator includes a disk ID and offset, which specify the physical disk location of the data block. Therefore, the SPA translates the metaslab ID and offset to a disk ID and disk offset (Step 423). The SPA subsequently writes the data block at the particular disk ID and offset (Step 424). At this stage, the SPA sends the metaslab ID and offset to the DMU (Step 426) and the process ends.

Once the SPA stores the data blocks on the last level of the tree, the DMU writes the corresponding indirect blocks (i.e., the indirect blocks that reference the data block). The indirect blocks are written in the same manner, with a new indirect block allocated using the metaslab allocator. The various levels of indirect blocks are written until the root block is encountered, as described above in the copy-on-write discussion. The root block is written by the SPA in a single atomic write that updates the tree to point to current data (i.e., the indirect blocks and data block written to using dynamic striping).

Using the aforementioned method, the location of each data block of striped data is specified by the DMU translation of the data block. In this case, DMU translation refers to the capability of traversing the tree to find a specific data block. Retrieving dynamically striped data requires tracing the DMU translation of the data block, regardless of where the data block is located relative to the physical disk space of the storage pool. Accordingly, retrieval of the dynamically striped data is not dependent on the number of physical disks present in the storage pool. For example, adding a physical disk to the storage pool does not change how existing striped data is accessed.

Figure 5:
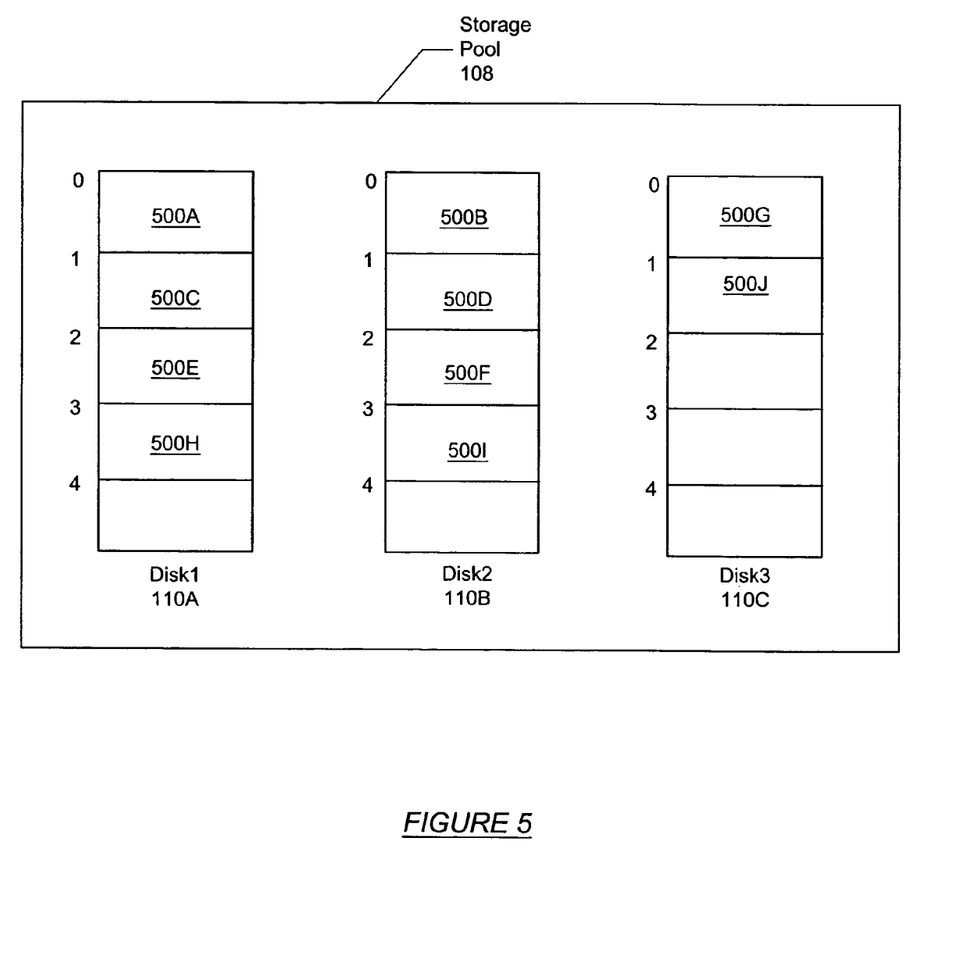
FIG. 5 shows an example of dynamic striping in accordance with an embodiment of the invention.

FIG. 5 shows an example of dynamic data striping in accordance with one embodiment of the invention. In this example, the file system initially stripes data across Disk1 (110A) and Disk2 (110B) using a round robin policy. Specifically, sequential data blocks 500A, 500B, 500C and 500D are evenly striped across Disk1 (110A) and Disk2 (110B). Subsequently, Disk3 (110C) is added to the storage pool. When Disk3 (110C) is added, the storage pool (108) is made aware of additional free disk space that may be used to store data.

At this stage, the metaslab allocator uses Disk3 (110C) as well to dynamically stripe data. In one embodiment of the invention, when a physical disk is added to the storage pool, the disk is divided into numerous metaslabs (not shown). The metaslab allocator is subsequently made aware that the new metaslabs exist as free storage space. Thus, using the current dynamic striping policy (i.e., a round robin policy), the metaslab allocator may subsequently stripe the subsequent data blocks (i.e., 500E, 500F, 500G, 500H, 500I, and 500J) across all three available disks (i.e., Disk1 (110A), Disk2 (110B), Disk3 (110C)). For example, to begin using Disk3 (110C), the metaslab allocator may allocate a data block using a disk ID of 3 and a specific offset within Disk3 (110C).

As noted above, in one embodiment of the invention, the dynamic striping policy may be changed at any point during the operation of the file system. If the dynamic striping policy is changed while striping data, the previously striped data is still valid and may be retrieved by the data block's DMU translation (i.e., traversing the tree by using the DMU and SPA to follow block pointers until the desired data block is obtained). Simultaneously, the new dynamically striped data may be placed in various physical disk locations using the updated dynamic striping policy. The data blocks striped with the new policy may also be retrieved in the same manner described above (i.e., by using the tree structure to locate data blocks within the storage pool).

In one embodiment of the invention, one or more physical disks may be added to the storage pool after multiple data blocks have been written using dynamic striping. In this case, the distribution of data may be heavily concentrated on the original physical disks. In one embodiment of the invention, in order to redistribute data, a background thread may be initiated to read and then rewrite all the previously stored data. When the background thread rewrites the data using dynamic striping, the data will be more evenly distributed across all the physical disks available within the storage pool. In one embodiment of the invention, the SPA may also provide a traditional striping module for file system users that prefer to maintain explicit control of data striping parameters (e.g., a fixed stripe width).

Figure 6:
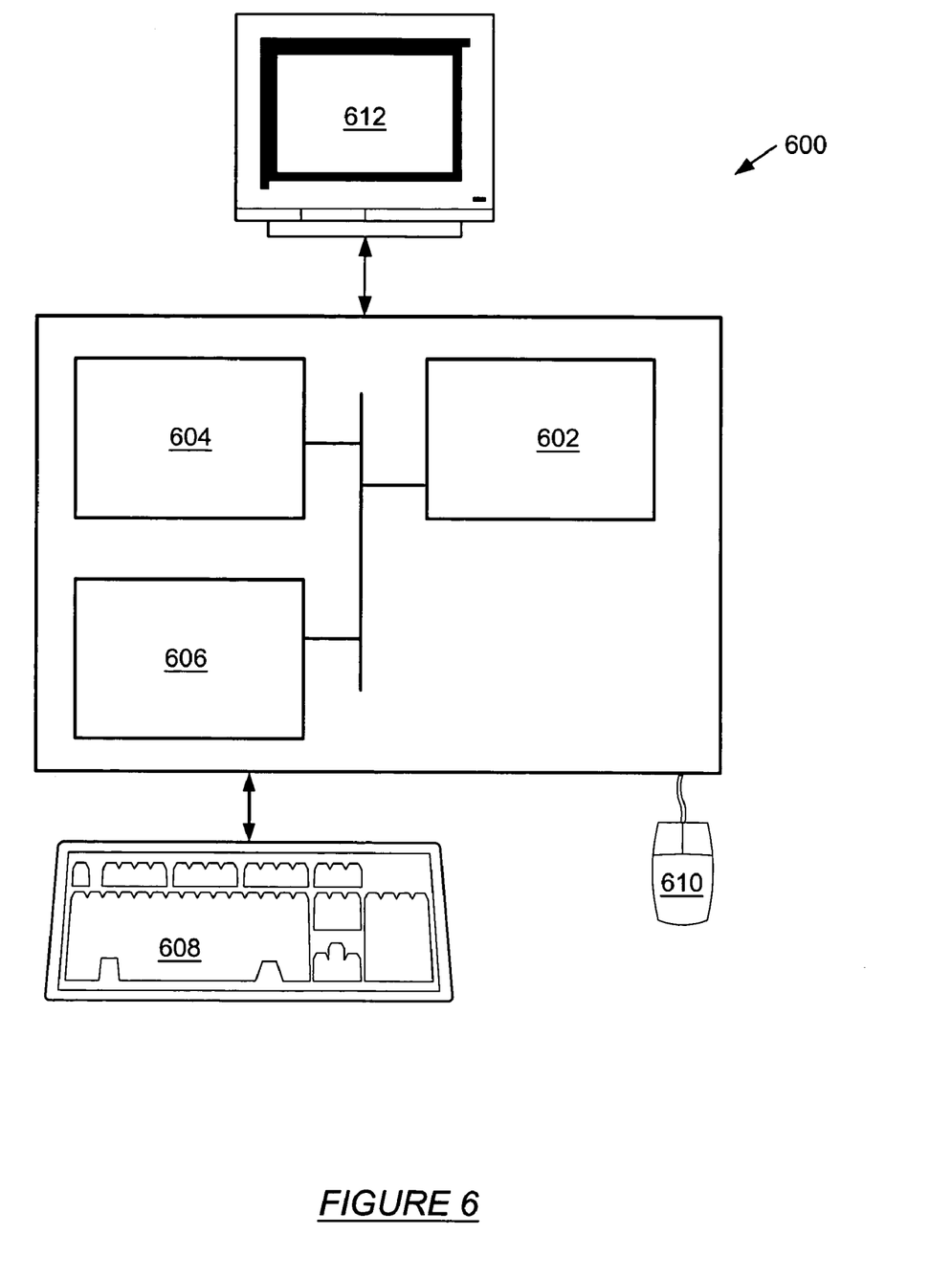
FIG. 6 shows a computer system in accordance with an embodiment of the invention.

The invention may be implemented on virtually any type of computer regardless of the platform being used. For example, as shown in FIG. 6, a networked computer system (600) includes a processor (602), associated memory (604), a storage device (606), and numerous other elements and functionalities typical of today's computers (not shown). The networked computer (600) may also include input means, such as a keyboard (608) and a mouse (610), and output means, such as a monitor (612). The networked computer system (600) is connected to a local area network (LAN) or a wide area network (e.g., the Internet) (not shown) via a network interface connection (not shown). Those skilled in the art will appreciate that these input and output means may take other forms. Further, those skilled in the art will appreciate that one or more elements of the aforementioned computer (600) may be located at a remote location and connected to the other elements over a network. Further, the invention may be implemented on a distributed system having a plurality of nodes, where each portion of the invention (e.g., the storage pool, the SPA, the DMU, etc.) may be located on a different node within the distributed system. In one embodiment of the invention, the node corresponds to a computer system. Alternatively, the node may correspond to a processor with associated physical memory.

Embodiments of the invention include the ability to make a file system explicitly aware of all the physical storage devices available. The allocation of blocks within the storage pool is subsequently stored within on-disk block pointers. This method allows dynamic striping of data because new physical storage devices may be added to the storage pool without affecting previously striped data. Additionally, the new device bandwidth and free space is capable of being used immediately.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for dynamic striping, comprising:
receiving a request to write a file into a storage pool, wherein the file comprises a first data block, a second data block, and a first indirect block;
determining a physical disk location in the storage pool to store the first data block using a first dynamic striping policy, wherein the first dynamic striping policy comprises one selected from a group consisting of a dynamic striping policy based on physical disk speed, a dynamic striping policy based on free space available on physical disks, a dynamic striping policy based on load on physical disks, and a round robin policy;
storing the first data block using the first dynamic striping policy at the physical disk location in the storage pool;
storing the second data block in the storage pool using the first dynamic striping policy;
selecting a second dynamic striping policy, wherein the second dynamic striping policy comprises one selected from the group consisting of the dynamic striping policy based on physical disk speed, the dynamic striping policy based on free space available on physical disks, the dynamic striping policy based on load on physical disks, and the round robin policy, and wherein the first dynamic striping policy is distinct from the second dynamic striping policy; and
storing the first indirect block using the second dynamic stripping policy, wherein the indirect block includes a first block pointer referencing the first data block and a second block pointer referencing the second data block.

2. The method of claim 1, further comprising:
retrieving the first data block using the first indirect block.

3. The method of claim 1, further comprising:
assembling the first indirect block, wherein assembling the first indirect block comprises populating a block pointer.

4. The method of claim 3, wherein populating the block pointer comprises:
storing the first data block checksum in a checksum field within the block pointer; and
storing the first data block location in the block pointer, wherein storing the data block location comprises storing a metaslab ID and offset.

5. The method of claim 4, further comprising:
storing a birth value in a birth field within the block pointer.

6. The method of claim 3, wherein the first indirect block is assembled using a data management unit.

7. The method of claim 1, wherein the storage pool comprises at least one storage device.

8. The method of claim 1, wherein the storage pool is divided into a plurality of metaslabs.

9. The method of claim 8, wherein each of the plurality of metaslabs is associated with a metaslab ID.

10. The method of claim 9, wherein the first data block location comprises the metaslab ID and an offset.

11. The method of claim 1, wherein storing the first data block comprises using a storage pool allocator.

12. A system for storing a first data block, comprising:
a storage pool comprising a file, wherein the file comprises:
a first data block and a second data block;
a first indirect block; and
a parent block referencing the first indirect block, wherein the first indirect block comprises a first block pointer that references the first data block and a second block pointer that references the second data block, wherein the first block pointer comprises the first data block location and the first data block checksum and the second block pointer comprises the second data block location and the second data block checksum; and
a storage pool allocator configured to:
store the first data block and the second data block in the storage pool using a first dynamic striping policy, wherein the first dynamic striping policy comprises one selected from a group consisting of a dynamic string policy based on physical disk speed, a dynamic striping policy based on free space available on physical disks, a dynamic striping policy based on load on physical disks, and a round robin policy,
select a second dynamic striping policy after storing the first and second data block, wherein the second dynamic striping policy comprises one selected from the group consisting of the dynamic striping policy based on physical disk speed, the dynamic striping policy based on free space available on physical disks, the dynamic striping policy based on load on physical disks, and the round robin policy, and wherein the first dynamic striping policy is distinct from the second dynamic striping policy, and
store the first indirect block and the parent block in the storage pool using the second dynamic striping policy.

13. The system of claim 12, further comprising:
a second indirect block, comprising a first indirect block checksum and a first indirect block location,
wherein the storage pool allocator is further configured to store the second indirect block in the storage pool using the second dynamic striping policy.

14. The system of claim 12, further comprising:
a data management unit configured to assemble the first indirect block and request the storage pool allocator to store the first indirect block.

15. The system of claim 12, wherein the storage pool comprises at least one storage device.

16. The system of claim 12, wherein the storage pool is divided into a plurality of metaslabs.

17. The system of claim 16, wherein each of the plurality of metaslabs is associated with a metaslab ID.

18. The system of claim 17, wherein the first data block location comprises the metaslab ID and an offset.

19. A computer system for dynamic striping, comprising:
a processor;
a memory;
a storage pool; and
software instructions stored in the memory for enabling the computer system under control of the processor, to:
receive a request to write a file into the storage pool, wherein the file comprises a first data block, a second data block, and a first indirect block;
determine a physical disk location in the storage pool to store the first data block using a first dynamic striping policy, wherein the dynamic striping policy comprises one selected from a group consisting of a dynamic striping policy based on physical disk speed, a dynamic striping policy based on free space available on physical disks, a dynamic striping policy based on load on physical disks, and a round robin policy;
store the first data block using the first dynamic striping policy at the physical disk location in the storage pool;

store the second data block in the storage pool using the first dynamic striping policy;

select a second dynamic striping policy, wherein the second dynamic striping policy comprises one selected from the group consisting of the dynamic striping policy based on physical disk speed, the dynamic striping policy based on free space available on physical disks, the dynamic striping policy based on load on physical disks, and the round robin policy, and wherein the first dynamic striping policy is distinct from the second dynamic striping policy; and store the first indirect block using the second dynamic striping policy, wherein the indirect block includes a first block pointer referencing the first data block and a second block pointer referencing the second data block.

20. A network system having a plurality of nodes, comprising:

a storage pool comprising a file, wherein the file comprises:
  a first data block and a second data block;
  a first indirect block; and
  a parent block referencing the first indirect block, wherein the first indirect block comprises a first block pointer that references the first data block and a second block pointer that references the second data block, wherein the first block pointer comprises the first data block location and the first data block checksum and the second block pointer comprises the second data block location and the second data block checksum; and a storage pool allocator configured to:
  store the first data block and the second data block in the storage pool using a first dynamic striping policy, wherein the first dynamic striping policy comprises one selected from a group consisting of a dynamic striping policy based on physical disk speed, a dynamic striping policy based on free space available on physical disks, a dynamic striping policy based on load on physical disks, and a round robin policy,
  store the first indirect block and the parent block using a second dynamic striping policy, wherein the second dynamic striping policy comprises one selected from the group consisting of the dynamic striping policy based on physical disk speed, the dynamic striping policy based on free space available on physical disks, the dynamic striping policy based on load on physical disks, and the round robin policy, and wherein the first dynamic striping policy is distinct from the second dynamic striping policy, wherein the storage pool is located on any one of the plurality of nodes, wherein the storage pool allocator is located on any one of the plurality of nodes.

* * * * *

UNITED STATES PATENT AND TRADEMARK OFFICE
CERTIFICATE OF CORRECTION

| | | |
|---|---|---|
| PATENT NO. | : 7,424,574 B1 | Page 1 of 1 |
| APPLICATION NO. | : 10/828677 | |
| DATED | : September 9, 2008 | |
| INVENTOR(S) | : Matthew A. Ahrens et al. | |

It is certified that error appears in the above-identified patent and that said Letters Patent is hereby corrected as shown below:

In Claim 12, column 10, line 11, the word "string" should be --striping--.

Signed and Sealed this

Thirtieth Day of December, 2008

JON W. DUDAS
*Director of the United States Patent and Trademark Office*